United States Patent
Simon et al.

(10) Patent No.: US 10,150,888 B2
(45) Date of Patent: Dec. 11, 2018

(54) SPRAYABLE COMPOSITION, ITS USE AND METHOD FOR SEALING OPENINGS OR GAPS IN BUILDING COMPONENTS

(71) Applicant: Hilti Aktiengesellschft, Schaan (LI)

(72) Inventors: Sebastian Simon, Buchloe Lindenberg (DE); Christian Foerg, Lamerdingen (DE); Stefanie Falkenberg, Augsburg (DE); Johann Huber, Landsberg (DE); Stefan Juli, Bludenz (DE); Edgar Draber, Odenthal (DE); Daniel Zoeller, Cologne (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/466,343

(22) Filed: Aug. 22, 2014

(65) Prior Publication Data

US 2015/0353774 A1 Dec. 10, 2015

(30) Foreign Application Priority Data

Jun. 6, 2014 (EP) ..................................... 14171602

(51) Int. Cl.
| | | |
|---|---|---|
| C09D 183/06 | (2006.01) | |
| E04B 1/66 | (2006.01) | |
| C08K 3/36 | (2006.01) | |
| C08K 5/5415 | (2006.01) | |
| C08K 5/5419 | (2006.01) | |
| C08K 5/5425 | (2006.01) | |
| C08K 5/5465 | (2006.01) | |
| C08K 5/57 | (2006.01) | |
| C09D 7/62 | (2018.01) | |
| C08L 83/00 | (2006.01) | |
| C08L 83/04 | (2006.01) | |
| C08G 77/16 | (2006.01) | |
| C08G 77/18 | (2006.01) | |

(52) U.S. Cl.
CPC .............. *C09D 183/06* (2013.01); *C08K 3/36* (2013.01); *C08K 5/5415* (2013.01); *C08K 5/5419* (2013.01); *C08K 5/5425* (2013.01); *C08K 5/5465* (2013.01); *C08K 5/57* (2013.01); *C08L 83/00* (2013.01); *C08L 83/04* (2013.01); *C09D 7/62* (2018.01); *E04B 1/66* (2013.01); *C08G 77/16* (2013.01); *C08G 77/18* (2013.01)

(58) Field of Classification Search
CPC ............... C08L 83/06; C08K 3/36; C07F 7/18
See application file for complete search history.

(56) References Cited

U.S. PATENT DOCUMENTS

| | | | | |
|---|---|---|---|---|
| 5,851,594 | A * | 12/1998 | Feder ........................ | C08J 3/03 427/387 |
| 5,904,988 | A * | 5/1999 | Stein ....................... | C08K 9/06 428/447 |
| 2010/0278771 | A1* | 11/2010 | Lobe ...................... | A01N 55/00 424/78.09 |

FOREIGN PATENT DOCUMENTS

| | | | |
|---|---|---|---|
| DE | 10 2008 003 155 A1 | | 7/2009 |
| EP | 649879 | * | 4/1995 |
| EP | 0 665 862 B2 | | 11/2003 |

OTHER PUBLICATIONS

European Search Report dated Nov. 19, 2014, with Statement of Relevancy (Six (6) pages).
English language Singaporean Search Report issued in counterpart Application No. 11201609240V dated Sep. 20, 2017 (five (5) pages).

* cited by examiner

*Primary Examiner* — Kuo Liang Peng
(74) *Attorney, Agent, or Firm* — Crowell & Moring LLP

(57) ABSTRACT

Described is a sprayable, stable composition containing at least one organopolysiloxane containing hydroxyl groups and/or hydrolyzable groups, at least one cross-linking agent on the basis of a functionalized silane, at least one filler on the basis of silicon dioxide, and at least one condensation catalyst, the use of said composition as a coating, and a method for sealing openings or gaps in building components.

16 Claims, No Drawings

SPRAYABLE COMPOSITION, ITS USE AND METHOD FOR SEALING OPENINGS OR GAPS IN BUILDING COMPONENTS

This application claims the priority of European Patent Document No. EP 14 171 602.7, filed Jun. 6, 2014, the disclosure of which is expressly incorporated by reference herein.

BACKGROUND AND SUMMARY OF THE INVENTION

Description

The present invention relates to a composition on the basis of moisture-cross-linking organopolysyloxanes, their use as a sealant, and a method for sealing openings and gaps in building components.

From prior art it has been known to seal gaps (hereinafter also referred to as "joints") between building components such as walls, for example, with sealants during the construction of a building. In building technology, a desired or tolerance-related gap or intermediate space between two building components or materials is referred to as a joint. One frequent use is the (fireproof) sealing of so-called connection joints or of moving joints such as occur, in particular, in overhanging facades. Connection joints necessarily occur, where two different components of the same or of different materials abut against each other. For this, frequently, an insulant is first inserted and, subsequently, a sealant is applied, preferably by means of a spraying method.

In doing so, the sealants, in particular water-based sealants, are typically adjusted in such a manner that they can be applied by means of a spraying method. Furthermore, this method has proven to be successful because very little material is used and, in addition, water-based sealants are highly attractive due to their price, when compared with silicone or those on the basis of MS polymers, or hybrids.

In doing so, the seal must not only cover the filled joint but also a certain region of the adjoining building components in order to ensure a seal against smoke and other toxic gasses, as well as allow a reliable fastening to the building components in order to ensure that, during a movement of the building components relative to each other, the seal will not detach from the building components and result in openings through which smoke and gasses may pass again. In particular, the use when sealing joints with overhanging facades makes great demands on the sealant to be used. Due to the frequently different materials, an adhesion of the seal to different materials must be ensured. In order to prevent the sealant from dripping or running off vertical surfaces or overhead surfaces, the formulation must be stable after it has been sprayed on.

Another special requirement for the sealants that are used with filled joints is that the formulations/compositions can be applied by airless technique. For this, the application pressure must be kept as low as possible or adjusted consistent with the relevant application requirements. With airless spraying techniques (without compressed air vaporization), vaporization of the material occurs at a hydraulic pressure at 50 to 250 bar. The material is compressed by means of a pump and pressed through the nozzle in such a way that it is finely vaporized. The workability of the coating can be influenced by the pressure, wherein it applies that with increased pressure the spray image becomes more homogeneous and more spread out. While applying the coating to joints filled with fibrous filler materials such as mineral wool, the pressure with which the composition is applied must not be too high, because the coating will otherwise deform the filler or penetrate too deeply into the filler, as a result of which the layers to be applied must become thicker or a pressure that is much too high can blow the filler out of the joint (material loss). In this situation, an upper limit for the pressure on the spray gun of a maximum of 100-120 bar has been found to be advantageous in order to thus ensure both good sprayability and also a low material loss with optimal workability.

However, it has been found to be disadvantageous in water-based or solvent-based compositions that the applied seals have relatively long curing times because they dry (harden) physically by evaporation of the water or solvent. The disadvantage of water-based systems, in particular, is the dependence on climatic conditions. With high air humidity, such systems require many times the drying time, especially at temperatures of from 5° C. to 15° C.

Furthermore, it has been found to be disadvantageous in this method that the applied seals can be damaged under certain weather conditions, in particular in rainy weather. The seals are applied mostly at a time when the building shell is not yet fully closed. The result of this is, for example, that rain may enter the building, thus causing the incompletely cured water-based sealant of the seal to be washed away or rinsed away.

Another disadvantage of currently available solutions is that water-based as well as low-viscosity silicone/silicone-urethane compositions are absorbed by insulating materials with which larger joints are filled, in particular, or that said insulating materials are wetted to such an extent that the sealant is absorbed by or penetrates the insulating material, as a result of which a smooth, cohesive surface cannot be achieved with only one coating operation.

Single-component sealants that can be stored in a water-free environment and that will cure at room temperature with the access of water to form elastomers have been known as the so-called "silicone sealants." Among other things, these products are used in large quantities in the construction industry. These mixtures are based on polymers, in particular siloxanes, more precisely organopolysiloxanes (frequently also referred to as poly(organo)siloxanes, that are terminated by silyl groups that have reactive substituents such as hydrolyzable groups. These sealants are distinguished in that they exhibit excellent adhesive behavior on a multitude of substrates. As a rule, they are sold and used as a highly viscous paste. The disadvantage of these sealants is however that they are too highly viscous for use with airless spray devices commonly used on construction sites and cannot be applied by spraying. Considering relevant silicone-based sealants that are adjusted at low viscosity, there is the problem of inadequate stability and that these sealants can be absorbed by the insulating material. Consequently, the known silicone-based sealants, like the water-based formulations, do not satisfy all the aforementioned requirements for a sealing of openings, gaps, or joints in construction components. Systems that require an addition of solvents for the reduction of viscosity have the disadvantage that they exhibit a poor wet layer to dry layer thickness ratio. In addition, the use of solvents may lead to a prolonged curing time.

Commercial sealants based on various compositions have been known. For example, Specified Technologies Inc. (STI) markets a product on the basis of a silicone/urethane hybrid composition containing approximately 13% of a solvent (SpecSeal® Fast Tack®). However, this product has the disadvantage that it is only conditionally sprayable, has a long curing time compared with strictly reactive systems, and, accordingly, is not weather-resistant after it has been applied. Particularly negatively affected is the curing of the composition, it being extremely prolonged at low temperatures. Moreover, an applied coating exhibits moderate stability. This system, too, experiences a loss from the wet layer thickness to the dry layer thickness, because the 13% of solvent are lost from the system during the drying/curing process.

Quest Construction Products, LLC, a subsidiary of Quest Specialty Chemicals, Inc., has featured two products for silicone-based coatings, an extremely highly filled system having a solids content of 96% (Unisil High Solid (Unisil HS)) and a highly filled solvent-containing system having a solids content of 80%. Unisil HS is sprayable only under quite specific conditions, thus making a universal use with different spraying devices impossible. Indeed, Unisil can be sprayed at higher pressures; however, it features only moderate stability and cures only slowly due to its proportional content of solvent.

Furthermore, water-based acrylate dispersions have been known, these containing additives for a faster skin formation. However, these compositions have the disadvantage that they exhibit only moderate resistance to rain and are strongly dependent on climatic conditions such as air humidity, temperature, and air movement.

Therefore, there is the continued need of a silicone composition that is free or mostly free of water and solvents, sprayable also at low temperatures but still stable, in particular with layer thicknesses above 3 mm, and features rapid skin formation and curing. In particular, it is to exhibit good adhesion to a plurality of different substrates as are found in the construction field and exhibit the lowest possible difference between wet layer thickness and dry layer thickness.

Therefore, it is the object of the present invention to provide a composition on the basis of organopolysiloxanes that cure to form high-elasticity elastomers that are sprayable and stable following application, and that feature a good spectrum of adhesion. Furthermore, a user-friendly curing time during application is desired, said curing time not being affected by high air humidity and low temperatures. In addition, the solution should not lose volume due to the release of solvents.

The object of the present invention can be learned from the patent claims, said object being the provision of a sprayable, stable composition containing
- at least one organopolysiloxane containing hydroxyl groups and/or hydrolyzable groups,
- at least one cross-linking agent on the basis of a functionalized silane,
- at least one filler on the basis of silicon dioxide,
- at least one condensation catalyst.

Preferably, the composition has a dynamic viscosity of at most 10,000 mPa·s, preferably 3,000 to 8,000 mPa·s (Brookfield DV-I+; Spindle 6; 25° C.; 100 rpm).

Another object of the present invention is the use of a composition of the aforementioned type as curable sealant or coating agent exhibiting improved properties.

Furthermore, one object of the present invention is a method for sealing openings or gaps in construction components.

The viscosities stated herein are dynamic viscosities that are usually measured with rotation viscosimeters. Unless stated otherwise, the dynamic viscosities were measured with a Brookfield DV-I+ or a Brookfield DV-II+ viscosimeter, respectively, at 25° C. and 100 rpm (revolutions per minute). To the extent that the spindle that is used is of importance, it is specifically identified. Other than that, the selection of the spindle may be made by the person skilled in the art.

The film is elastomeric and able to adapt to contraction (−) and expansion (+) movements of at least ±3%, preferably at least ±10%, and particularly preferably at least ±15%, in each case measured relative to the nominal joint width in accordance with ASTM test method E 13099-91 "Standard test procedure for the cyclic motion and measurement of minimum and maximum joint widths in architectural joint systems."

The term "nominal joint width" refers to the width of the joint in resting/initial state.

The inventive composition is distinguished by low viscosity in the high shearing range so that it is sprayable. Within the meaning of the invention, "sprayable" means that the composition can be applied with airless spraying devices at a pump output pressure of a maximum of 220 bar and a flow volume of a maximum of 5 L/min., preferably 2 to 3 L/min., as is usually used on construction sites. This is achieved without the use of solvents that subsequently affect the properties of the applied and/or cured composition. Furthermore, it is possible to thus achieve a high solid substance filling level. In addition to the sprayability, the inventive composition is distinguished in that it is stable after the application of a layer thickness of at least up to 3 mm and does not flow down vertical surfaces. Still, the composition can be evacuated without problems from the storage vessel.

Another advantage of the inventive composition is its rapid curing, in particular in high air humidity, so that a film is formed very quickly, said film aiding the stability, on the one hand, and protecting the not yet sufficiently cured part of the composition against subsequent external influences such as high humidity or direct rain, on the other hand.

There are no restrictions regarding the organopolysiloxanes used in the inventive composition as long as they have hydroxyl groups or hydrolyzable groups as terminal groups, wherein these, optionally after the hydrolysis with water, can form Si—O—Si bonds due to a condensation reaction. The composition of the present invention is, in particular, a single-component composition on the basis of organopolysiloxanes having reactive functional terminal groups that will vulcanize at room temperature. Vulcanization requires air humidity. Commonly, such systems are referred to as RTV-1 silicones (RTV=room temperature vulcanizing; 1=single component).

In doing so, the organopolysiloxane is moisture-curing and contains cross-linkable groups such as silicon-bonded hydroxy, alkoxy, alkenyloxy, aryloxy, acetoxy, or ketiminoxy (herein also referred to as ketoxime), amino or amido groups that, in the presence of water, in particular, air humidity, form an Si—OH group while splitting off the respective hydrolyzable group, these, again, condensing (=curing or vulcanizing) while forming an Si—O—Si bond.

The organopolysiloxane containing hydroxyl groups or hydrolyzable groups is, preferably, an α,ω-functional organopolysiloxane that has at least two functional groups per molecule, these being potentially condensable after hydrolysis.

Such organopolysiloxanes can be represented by the General Formula (I):

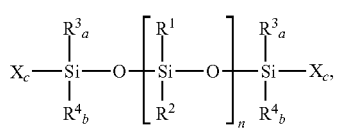

(I)

wherein
  a=0 or 1,
  b=0 or 1,
  with a+b=0, 1 or 2,
  c=3−(a+b),
  n has a value to provide the composition at a temperature of 25° C. with a dynamic viscosity of a maximum of 10,000 mPa·s (Brookfield DV-I+; Spindle 6; 100 rpm);
  the radicals X are identical or different and have an OH group with a+b=2, an alkoxy or alkenoxyl radical having 1 to 10 carbon atoms, an aryloxy radical having 6 to 13 carbon atoms, an acyloxy radical having 1 to 13 carbon atoms, a ketoxime group having 1 to 8 carbon atoms or a functional amino group or amido group having 1 to 6 carbon atoms that are attached to the silicon by an Si—N bond;
  the radicals $R^1$ and $R^2$ are the same or different and are linear or branched univalent hydrocarbon radicals having 1 to 12 carbon atoms that, optionally have one or more heteroatoms and, optionally, one or more C—C double bonds and/or, optionally, cycloaliphatic and/or aromatic parts or radicals;
  the radicals $R^3$ and $R^4$ are the same or different and are organic aliphatic alkyl, aminoalkyl, polyaminoalkyl, epoxyalkyl, alkenyl radicals having 1 to 13 carbon atoms, aromatic aryl radicals having 6 to 13 carbon atoms, wherein at least 2, and, preferably, at least 3 functional groups per molecule are present, these being optionally condensable after hydrolysis.

The following groups can be mentioned as examples of the radical X: alkoxy such as, for example, methoxy, ethoxy or octyloxy, alkenyloxyl such as, for example, vinyloxy, hexenyloxy or isopropenyloxy, aryloxy such as, for example, phenyloxy, acyloxy such as, for example, acetoxy, ketoxime such as, for example, ON=C(CH$_3$)C$_2$H$_5$; amino derivatives such as, for example, ethylamino or phenylamino derivatives, amido derivatives such as, for example, methylacetamido derivatives.

The following organic aliphatic or aromatic radicals can be mentioned for $R^1$, $R^2$: for example, the methyl, ethyl, octyl, trifluoropropyl, vinyl, phenyl groups; for $R^3$, $R^4$: for example, the methyl, ethyl, octyl, vinyl, allyl, phenyl groups; —(CH$_2$)$_3$—NH$_2$; —(CH$_2$)$_3$—NH—(CH$_2$)$_2$—NH$_2$.

The radicals $R^1$ and $R^2$ preferably are alkyl radicals having 1 to 5, in particular 1 to 3, carbon atoms, and, preferably, are methyl groups.

The viscosity of the hydroxyl groups and/or the organosiloxanes containing hydrolyzable groups that are used, in doing so, depends on the fillers, including the reinforcing fillers and, optionally, additional liquid components and is selected depending on the fact that the composition exhibit a dynamic viscosity of a maximum of 10,000 mPa·s, preferably 3,000 to 8,000 mPa·s (Brookfield DVI+; Spindle 6; 25° C.; 100 rpm).

The organosiloxane having Formula (I) preferably has a dynamic viscosity of a maximum of 10,000, preferably a maximum of 7,000 mPa·s, further preferably a maximum of 5,000 mPa·s (Brookfield DV-II+; 25° C.; 100 rpm). Particularly preferably, the organosiloxane at 25° C. has a dynamic viscosity within the range of 500 to 3,000 mPa·s, and further preferably 750 to 2,500 mPa·s (Brookfield DV-II+; 25° C.; 100 rpm).

Although the organopolysiloxanes are defined as if they were one individual material type, it is possible or, in some cases even desirable, to use mixtures of different organopolysiloxanes in order to adjust the required viscosity. It has been found that mixtures exhibiting this desired viscosity can be prepared in that a mixture of an organopolysiloxane having a high viscosity and an organosiloxane having a low viscosity are used as the organopolysiloxane. The quantities of the two organopolysiloxanes are selected such that the mixed viscosity is within the desired range. The mixed viscosity of the mixture of organopolysiloxanes is known per se and defined by the following formula: $\log n_B = X_1 \log n_1 + X_2 \log n_2$. In the formula, the following have the indicated meaning: $\log n_B$ the logarithm of the viscosity of the mixture; $X_1$ the percentage of the first organopolysiloxane in the mixture, and $\log n_1$ the logarithm of the viscosity of the first organopolysiloxane in the mixture; $X_2$ the percentage of the second organopolysiloxane in the mixture, and $\log n_2$ is the logarithm of the viscosity of the second organopolysiloxane in the mixture. According to this formula, two organopolysiloxanes are selected in such a manner that the desired viscosity is adjusted in the mixture. However, for many inventive purposes the preferred organopolysiloxane is one single organopolysiloxane.

In particular, the proportion of the organopolysiloxane depends on the type and quantity of fillers that are contained in said organopolysiloxanes. In accordance with the invention, the inventive composition may contain other additional fillers along with the fillers on silicon dioxide basis. This also affects the percentage in which the organopolysiloxane may be contained. The person skilled in the art may simply determine the suitable quantity.

In systems having a low solids content, i.e., without any other fillers in addition to the fillers on silicon dioxide basis, the percentage of the organopolysiloxane is preferably 25 to 80 wt %, preferably 50 to 65 wt %, with respect to the total composition. In filled systems, i.e., in compositions according to the invention, that contain other additional fillers, the percentage of the organopolysiloxane is 25 to 50 wt %, preferably 30 to 40 wt % and particularly preferably 30 to 35 wt %, with respect to the total composition.

Furthermore, the composition contains one or more cross-linking agents.

Essentially, there is no restriction regarding the cross-linking agent that can be used in the composition according to the invention other than that it must be able to cross-link organopolysiloxanes having functionalized terminal groups while forming cured compositions. Compounds that are usually used for organopolysiloxanes and that are known to the person skilled in the art can be used as cross-linking agents.

The cross-linking agent is preferably selected, e.g., from among tetraalkoxysilane, organotrialkoxysilane, diorganodialkoxysilane and/or oligo(organoalkoxysilane), tetrakisketoxime silane, organotrisketoxime silane, diorganobisketoxime silane and/or oligo(organoketoxime silane), these having optionally been functionalized with one or more heteroatoms in the organyl radical, or mixtures thereof.

The cross-linking agent is preferably a silane having the Formula (II):

$$(R')_q\text{—Si—}(R'')_{4-q} \quad \text{(II)}$$

Wherein the radical R' is, independently, a radical as has been defined hereinabove for $R^3$ and $R^4$ in the organopolysiloxane having Formula (I). Of course, in doing so, R' is independent of the meanings of $R^3$ or $R^4$ in the organopolysiloxane. Wherein R" is, independently, a radical as has been defined hereinabove for X in the organopolysiloxane having the Formula (I). Of course, in doing so, R" is independent of the meaning of X in the organopolysiloxane. Preferably, the radicals R" represent alkoxy-groups or ketoxime groups, as have been described hereinabove.

Furthermore, the index q stands for a value of 0 to 4, with the proviso that, if q is a value of 3 or 4, at least q-2 radicals R' have at least one group that reacts with the hydroxyl, alkoxy, acetoxy, amino or ketoxime groups of the organopolysiloxane. In particular, q stands for a value of 0, 1, or 2, preferably a value of 0 or 1. Preferably, the radical R" stands for a ketoxime group —O—N═CYZ, wherein Y and Z, independent of each other, form straight-chained or branched hydrocarbon radicals that are optionally substituted with halogens, or Y and Z, together, form a hydrocarbon ring together with the carbon atom, to which these are bound; preferably, Y and Z, which may be the same or different, represent $C_1$-$C_8$-alkyl or haloalkyl radicals, particularly preferably $C_1$-$C_8$-alkyl radicals.

Examples of suitable silanes having Formula (II) are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane, tetra-n-butoxysilane, methyltris(methylethylketoxime)silane, phenyltris(methylethylketoxime)silane, vinyltris(methylethylketoxime)silane, methyltris(methylisobutylketoxime)silane, methyltris(methylpropylketoxime)silane or tetra(methylethylketoxime)silane. Particularly preferred are methyltrimethoxysilane, vinyltrimethoxysilane, tetraethoxysilane, methyltris(methylethylketoxime)silane, vinyltris(methylethylketoxime)silane, methyltris(methylisobutylketoxime)silane and methyltris(methylpropylketoxime)silane.

Furthermore, the silanes having Formula (II) may also be already partially (part of R"=OH) or fully hydrolyzed (all R"=OH). Due to the strongly increased reactivity of partially or fully hydrolyzed silanes, their use as cross-linking agents may be advantageous. In doing so, the person skilled in the art knows that with the use of partially or fully hydrolyzed silanes for the formation of oligomeric siloxanes, it is particularly likely that dimers and/or trimers may form, these being formed due to the condensation of hydrolyzed silanes.

Particularly preferred oligomeric siloxanes are, for example, hexamethoxydisiloxane hexaethoxydisiloxane, hexa-n-propoxydisiloxane, hexa-n-butoxydisiloxane, octaethoxytrisiloxane, octa-n-butoxytrisiloxane, decaethoxytetrasiloxane.

Of course, it is possible to use any desired mixtures of the aforementioned silanes as the cross-linking agents for the organopolysiloxanes.

The proportion of cross-linking agent is preferably up to 10 wt %, further preferably 2 to 8 wt %, particularly preferably 3 to 7 wt %, with respect to the total composition.

Furthermore, the composition comprises a filler on the basis of silicon dioxide that preferably has a reinforcing effect, which means that it, too, is cross-linked. Examples therefor are silica, colloidal silicic acid, pyrogenic silicic acid and precipitated silicic acid. Preferred as silicic acid are hydrophobic silicic acids, i.e., surface-treated silicic acids, in particular hydrophobic, pyrogenic silicic acid, in particular, highly disperse silicic acids from polypyrolysis processes. Typically, suitable hydrophobic silicic acids have a BET surface within the range of 100 to 300 m²/g. The BET surface is determined, for example, in accordance with EN ISO 18757.

Suitable hydrophobic silicic acids can be produced, for example, by hydrophobizing hydrophilic silicic acids with organosilanes or organosiloxanes, e.g., octamethylcyclotetrasiloxane, polydimethylsiloxane, dimethyldichlorosilane or hexamethyldisilazane.

A suitable amount of filler on the basis of silicon dioxide, this also including mixtures, is preferably within the range of 1 to 20 wt %, further preferably 1 to 10 wt %, particularly preferably 1 to 7 wt %, with respect to the total composition.

In one embodiment the composition may further comprise another filler that is silicate-free and thus has an essentially non-reinforcing effect. Examples of suitable fillers are inorganic and organic fillers, for example, carbonates, pyrogenic and/or precipitated metal and/or half-metal oxides or hydroxides, or mixed oxides thereof, with the exception of silicon compounds, sulfates, carbides, nitrides, silicates, glass, carbon modifications, natural non-silica minerals, or carbon types. The silicate-free fillers may optionally be surface-treated ("coated"). Specific examples are natural, ground or precipitated calcium carbonates, e.g., chalk, that are optionally coated with fatty acids, in particular, stearic acid. The mean particle size of the fillers should be within the range of 0.01 to 30 μm.

The filler is selected depending on the desired property of the composition. If a highly cross-linked composition exhibiting high tearing resistance is desired, a reinforcing filler, in particular silica gel, optionally together with a non-reinforcing filler such as, for example, calcium carbonate, is used. Other properties, as well as the usable quantities of fillers can be adjusted via the surface quality of the fillers.

However, in order to obtain a composition that is as hydrophobic as possible and that will not be absorbed by a carrier material that is mostly hydrophilic, i.e., will not penetrate said carrier material, so that the surface of the coating remains uniformly flat, particular preference is given to hydrophobized fillers, in particular hydrophobized silicate-free fillers and/or fillers on the basis of silicon dioxide.

A suitable amount of silicate-free filler, this also including mixtures, is preferably within the range of up to 60 wt %, further preferably 20 to 50 wt %, particularly preferably 30 to 40 wt %, with respect to the total composition.

In a preferred embodiment the inventive composition additionally contains at least one condensation catalyst. It acts as the catalyst for cross-linking the organopolysiloxanes. This can also accelerate curing of the composition. Among other things, this has the effect that the composition—if used as coating for sealing openings or gaps—will become insensitive very early on to harmful weather conditions such as possibly pouring or driving rain.

Also, there are essentially no restrictions regarding the condensation catalysts used in the inventive composition. A multitude of the cross-linking catalysts common in silane chemistry can be used.

Preferred condensation catalysts are organyl compounds and/or complexes of metals or half metals, in particular those of Group Ia, IIa, IIIa, IVa, IVb, or IIb of the Periodic System of Elements such as, e.g., Sn compounds, Ti compounds such as titanates and borates or mixtures thereof.

Preferred tin organic compounds are dialkyl tin compounds selected from among e.g., dimethyltin di-2-ethylhexanoate, dimethyltin dilaurate, di-n-butyltin diacetate, di-n-butyltin di-2-ethylhexanoate, di-n-butyltin dicaprylate, di-n-butyltin di-2,2-dimethyloctanoate, di-n-butyltin dilaurate, di-n-butyltin distearate, di-n-butyltin dimaleinate, di-n-butyltin dioleate, di-n-butyltin diacetate, di-n-octyltin di-2-ethylhexanoate, di-n-octyltin di-2,2-dimethyloctanoate, di-n-octyltin dimaleinate, and di-n-octyltin dilaurate. Compounds that are referred to as titanates or organotitanates are those that have at least one ligand bound to the titanium atom via an oxygen atom. Ligands bound to the titanium atom via an oxygen-titanium bond that are suitable are those that are selected from the group comprising the alkoxy group, sulfonate group, carboxylate group, dialkylphosphate group, dialkylpyrophosphate group and acetylacetonate group. Preferred titanates are, for example, tetrabutyl or tetraisopropyl titanate. Other suitable titanates have at least one multi-tooth ligand, also referred to as a chelating ligand. In particular, the multi-tooth ligand is a two-tooth ligand.

Of course it is possible, or even preferred in certain cases, to use mixtures of different condensation catalysts.

The person skilled in the art knows that the percentage of the condensation catalyst depends on the selected organopolysiloxanes, in particular the functional silane groups, and he can determine the amount accordingly. The amount of condensation catalyst is preferably up to 6 wt %, further preferably up to 3 wt %, and particularly preferably up to 1 wt %, with respect to the total composition. With the use of tin catalysts, the preferred amount is up to 0.4 wt %, with respect to the total composition.

In a further embodiment, the inventive composition may additionally contain a non-functionalized organopolysiloxane, i.e., an organopolysiloxane that is free of hydroxyl groups and/or of hydrolyzable groups. As a result of this, it is possible to adjust the viscosity of the entire formulation to a specific value in addition to the viscosity selected for the organopolysiloxane. Furthermore, their use enhances the hydrophobic properties of the entire composition.

In this case, the already mentioned organopolysiloxanes can be used, unless they have been functionalized. Suitable, non-functionalized organosiloxanes are, for example, silicone oils having the General Formula (III):

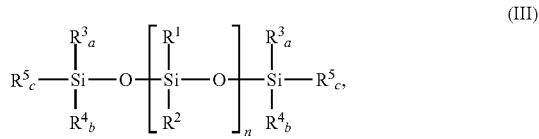

(III)

wherein the radicals $R^1$ to $R^4$ have the same meaning as in Formula (I) hereinabove, $R^5$ may have the same meaning as $R^1$ or $R^2$.

The non-functionalized organosiloxane preferably has a dynamic viscosity of preferably up to 1,000 mPa·s, preferably up to 200 mPa·s, and particularly preferably up to 10 mPa·s (Brookfield DV-II+; 25° C.; 100 rpm) at 25° C.

The percentage of non-functionalized organosiloxane is preferably up to 40 wt %, further preferably up to 30 wt %, particularly preferably 5 to 25 wt %, with respect to the total composition.

In another embodiment, the inventive composition may additionally contain an adhesion promoter. The use of an adhesion promoter enhances a cross-linking of the component with the composition so that adhesion in cured state is increased.

Also, there is essentially no restriction in view of the adhesion promoters that are used in the inventive composition.

For example, the following compounds that can be used as promoters can be mentioned: N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilylpropylamine, N-phenyl-γ-aminopropyltrimethoxysilane, triaminofunctional trimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, ß-glycidoxypropyltrimethoxysilane, ß-glycidoxyethyltrimethoxysilane, ß-(3,4-epoxycyclohexyl)propyltrimethoxysilane, ß-(3,4-epoxycyclohexyl)ethylmethyldimethoxysilane, isocyanatopropyltriethoxysilane, isocyanatopropylmethyldimethoxysilane, ß-cyanoethyltrimethoxysilane, γ-acryloxypropyltrimethoxysilane, γ-methacryloxypropylmethyldimethoxysilane, 4-amino-3,3-dimethylbutyltrimethoxysilane, and N-ethyl-3-trimethoxysilyl-2-methylpropaneamine.

Furthermore, silanes or oligomeric, functionalized silanes coupled to low-viscosity polymers can also be used as adhesion promoters.

The percentage of adhesion promoters is preferably up to 5 wt %, further preferably up to 3 wt %, particularly preferably 0.5 to 2 wt %, with respect to the total composition.

Compared to the so far known sealants, adhesives, or coating agents, the inventive compositions are distinguished by the following advantageous properties:
  water-free and solvent-free;
  sprayable, in particular with the use of airless spraying devices (max. pump output pressure is 220 bar, volume flow max. 5 L/min.);
  following the application of a layer having a thickness of at least 3 mm, the composition is stable, i.e., the composition does not slide off vertical surfaces;
  rapid curing (skin formation) and through-hardening, above all at high air humidity (skin formation time at room temperature<30-40 min.; through-hardening of 2 mm layer<24 h);
  good mechanical properties (elongation at tear>200%; movement of joint without tear, ±12.5%);
  quick rainfastness (no partial dissolution or washing out by water such as, e.g., rain, before skin formation), e.g., in accordance with ASTM D 6904-03 (2013);
  Workability, i.e., sprayable, even at low temperatures<5° C.

The fields of use of the inventive composition are not restricted. The compositions are suitable, in particular, as sealants and coating agents.

Accordingly, a further object of the invention is the use of the above-described composition as a sealant or as a coating agent. In particular, the composition is suitable as a sealant or coating agent for construction purposes such as the sealing of openings, joints, and gaps, more precisely, floor/floor joints, wall/wall joints, wall/floor joints. The inventive composition is especially suitable for the sealing of joints or connection joints or adjoining joints between two construction components (floor/floor, floor/wall, wall/wall) such as the connection joints of projecting facades. The composition may also be used as a sealant for sealing openings through components, through which lines of any type are laid, in order to again close the circular gap or opening after the lines have been installed.

Accordingly, a further object of the invention is a method for sealing openings in components used in buildings to prevent the spreading of fire and/or smoke gas, comprising the following steps:
(a) filling of the opening or gap with a carrier material,
(b) application of a coating having an aforementioned composition, and
(c) allowing the coating to cure.

The first step of this method is to fill the opening with a carrier or insulating material, so that a filled opening is attained. The amount of carrier material that is used depends on the size of the opening and will be individually determined. Generally, the opening should be filled with a sufficient amount, so that the gap between the construction components is completely closed. Considering static joints, i.e., joints between construction components that are not subject to movement, meaning that the joint width remains essentially constant, it is sufficient if the joint is filled across its width flush with the carrier or insulating material. Flush in this case means that enough carrier or insulating material is inserted in the joint that there will remain no gap between the carrier or insulating material and the respectively adjoining construction component. Now it is ensured that the coating will not be damaged in case of fire. Considering dynamic joints, i.e., joints between construction components that are or may potentially be subject to movement, meaning that the joint width may become smaller or larger, the carrier or insulating material must be inserted in compressed state into the joint, so that it will be able to compensate for the movement of the construction components, and no gap will result between the carrier or insulating material and the respective adjoining construction component. Only in this way is it ensured that the coating will not be damaged in case of fire. Preferably, the material is sufficiently compressed that it can theoretically compensate twice the maximum possible joint width. Preferably, the carrier or insulating materials is compressed by up to 30%-40%, particularly preferably by up to 50%, of its original width.

With thin coatings of up to approximately 3 mm, it is important that the carrier or insulating material is inserted into the joint in such a manner that its surface is flush with the surface of the horizontally adjoining construction component, so that no step is formed because, referring to dynamic joints, the coating could otherwise be damaged by the movement of the construction components. With thicker coatings it is not so critical if the surface of the carrier or insulating material is not flush with the surface of the horizontally adjoining construction component. Thicker coatings tolerate a small step in dynamic joints.

The usual materials that are commonly used for filling openings and joints can be used as carrier materials. The main purpose of the carrier material is to reduce the size of an opening or the width of the gap created by a joint, so that the applied coating is able to bridge the opening or the joint, without caving in. A second purpose of the carrier material is to provide an insulation against heat such as in the case of fire, or also against sound.

Examples of suitable carrier materials are mineral wool, rock wool, glass wool, glass fibers, fiber glass or ceramic fibers, reinforcing cardboard or reinforcing rods or cords or combinations thereof. Preferably, the carrier materials that are used do not restrict the movability of the construction components. Preferably, a non-flammable material is used as the carrier material for purposes of fire protection. Preferred carrier materials are mineral wool and ceramic fibers.

In the next step, a coating having the above-described inventive composition will be applied planparallel to and overlapping with the construction components to the surface of the filler; i.e., the coating covers the filled opening and the marginal regions of each construction component adjoining the filled opening. The longitudinal extension or overlap of the coating along the components adjoining the filled opening is not critical other than that it should be of sufficient size to prevent a tearing or separating of the elastomeric film that forms after curing due to the movement caused by expansion or contraction of the structural components of each object moved through it. Generally, the application of one coat having a thickness of 20 mm to 40 mm along the construction components adjoining the opening will be sufficient.

The coating is applied by spraying technique. The application by spraying with the use of devices using uncompressed air (airless) is particularly preferred. The device features a pump output pressure of a maximum of 220 bar and a flow volume of a maximum of 5 L/min., preferably 2-3 L/min. In order to ensure complete coverage, one or more layers of the composition may be applied.

The thickness of the coating that is to be applied is selected in such a manner that the cured composition has a thickness of 0.25 to 10 mm, preferably 1.0 to 6.0 mm, particularly preferably 1.5 to 3.0 mm.

After curing, the inventive composition forms a cohesive film. This means that the film is without tears or cavities that could allow the penetration of smoke. In addition, the film retains its cohesive quality after movements of construction components adjoining the opening.

The exemplary embodiments hereinafter are to explain the invention in greater detail, wherein the selection of the examples is not intended to pose a restriction of the scope of the object of the invention.

EXEMPLARY EMBODIMENTS

Example 1

For the preparation of the inventive composition, the individual components are mixed and homogenized as stated hereinafter:

| | |
|---|---|
| 30-40 wt % | Hydrofunctional polymer (dynamic viscosity: 750 mPas (Brookfield DV-II+; 25° C.; 100 rpm)) |
| 20 wt % | Silicone oil (dynamic viscosity: 10 mPas (Brookfield DV-II+; 25° C.; 100 rpm)) |
| 30%-40% | Silicate-free filler |
| 2-3 wt % | Filler on silicon dioxide basis |
| 3-5 wt % | Cross-linking agent on ketoxime silane basis |
| 0.05-0.1 wt % | Catalyst |

Comparative Example 1

For comparison, a commercial product on the basis of a silicone/urethane hybrid composition (SpecSeal® Fast Tack® Firestop Spray; Specified Technologies Inc.) was used.

Comparative Example 2

For further comparison, another commercial product on the basis of a highly filled (solids content, 80%) silicone composition (Unisil; Quest Construction Products, LLC.) was used.

In each case it was checked whether the compositions can be applied with a commercially available small airless device (SprayTECH® EPX2355), and the resultant spray image was checked. Furthermore, the curing behavior was checked based on the skin formation time and, in part, on the tack free time, and the curing of a 3 mm thick sample, and the stability to pouring or driving rain was checked. Also, the stability of the compositions was determined with the squeegee test.

Evaluation of Sprayability

The sprayability was evaluated with a device of the EXP2355 series by SprayTECH Inc. with nozzle 417. The spray image was evaluated and the spraying width was determined in that the composition was sprayed with a nozzle 417 (spray angle, 40°) from a distance of 30 cm at a preset output pressure of 120 bar at a temperature of 5° C. on a vertical surface; in doing so, a spraying width of 20 cm or more is ideal. A composition resulting in a perfect spray fog, a homogeneous material film without visible material accumulations and guide beams during the spraying operation was rated as a sprayable composition.

Determination of Skin Forming Time and Tack Free Time

In order to determine the skin forming time, a wedge mold having a length of 30 cm, a width of 1 cm, and a thickness between 100 mm at one end and 0 mm at the other end was filled with the respective mixtures. The time was determined as of when a cohesive layer can be pulled off.

The curing behavior was also based on the time until the formulation no longer exhibited a tacky surface (tack free time). This time (tack free time) was determined according to ASTM C 679-013 (2009) (Standard Test Method for Tack Free Time of Elastomeric Sealants) ((23° C.±2° C.; 50%±5% relative air humidity (73.4° F.±3.6° F.; 50%±5% relative humidity)).

Evaluation of the Resistance to Pouring or Driving Rain

The stability in pouring or driving rain was determined according to ASTM D 6904-03 (2013) (Standard Practice for Wind Driven Rain for Exterior Coatings Applied on Masonry) with the following variables: For the determination, a gap having a width of 10.16 cm (4 inches) between two concrete substrates was filled with mineral wool and a layer of an inventive composition was applied, wherein the layer had the following dimensions 406.4 mm×203.2 mm×2 mm (l×w×h) (16 inches×8 inches×0.08 inches). The coating was dried under standard conditions ((23° C.±2° C.; 50%±5% relative humidity (73.4° F.±3.6° F.; 50%±5% relative humidity)) for 160 minutes. The application of water took place under the following conditions: 2 hours at a pressure of 1.2 [in $H_2O$] (inches of water column; approximately 2.99 [mbar]), amount of water: 227.12-264.98 L/h (60-70 gal/h); visual control (visual inspection).

Determination of Rainfastness

In order to determine the resistance to rain, a water beam was directed at regular time intervals through a commercially available shower head from a height of 1 m on a coating having the respective composition, and the time, at which there was no longer any occurrence of damage to the formed skin, was determined by visual inspection.

Determination of Curing

In order to determine the skin forming time, a wedge mold having a length of 30 cm, a width of 1 cm, and a thickness between 100 mm at one end and 0 mm at the other end was filled with the respective mixtures. At regular intervals, it was checked to what extent the samples can be removed from the wedge mold. The time was determined at which samples having a thickness of 3 mm could be removed from the Teflon mold.

Determination of Stability (ASTM D 3730, D4400)

The measurement is performed according to the following test specifications: With the use of a BYK Gardner test chart (Chart AG 5310/2814) the samples to be checked are applied with a sagging doctor blade (BYK) in stripes having different thicknesses (2, 3, 4, 5, 6, 8, and 2 mm), each having a width of 10 mm, at a distance of 5 mm from each other.

In doing so, the sample is applied in the black region of the test chart. The sagging doctor blade is applied to the recesses facing downward onto the test chart. The bent edges of the sagging doctor blade point to the left.

The sagging doctor blade is drawn from the black to the white region, parallel to the upper and lower edges of the test chart. Subsequently, the test chart is brought into a vertical position so that the lines point in horizontal direction. Timing is begun (10 min.).

The results of each of the determinations are provided in Tables 1 and 2. This shows that the inventive composition, compared to commercially available compositions, are excellently sprayable—even at low temperatures—and are highly stable following application. The composition very rapidly forms a highly stable skin and also quickly cures fully, even at low temperatures, this making the inventive composition clearly sooner resistant to rain and pouring or driving rain than the commercially available compositions.

TABLE 1

Sprayability test results

| Examples | Comparison 1 | Comparison 2 | 1 |
|---|---|---|---|
| Airless device, nozzle 417 [cm] (5° C.)[1] | sprayable; 7-12[2] (max. 110 bar[3]) | sprayable; 7[2] (max. 105 bar[3]) | sprayable; 7-11[2] (max. 105 bar[3]) |

[1] Device: EPX 2355 by SprayTECH
[2] Spraying width
[3] Pump output pressure

TABLE 2

Results of the determination of rainfastness, curing time, skin-forming time, and stability

| Examples | Comparison 1 | Comparison 2 | Example |
|---|---|---|---|
| Rainfastness [h] (23° C.; 50% RH)[4] | >6 | n.d. | as of 1-2 |
| Rainfastness [h] (5° C.; 80% RH)[4] | >23 | as of 6 | as of ~2 |
| Curing time, 3 mm [h] (23° C.; 50% RH)[4] | 16-17 | 33 | 11 |
| Curing time, 3 mm [h] (10° C.; 80% RH)[4] | 55 | 33 | ~20 |
| Curing time, 3 mm [h] (−5° C.; 80% RH)[4] | none | n.d. | 120 |
| Skin formation, 0.5 mm [h] (23° C.; 50% RH)[4] | >6 | n.d. | <1 |
| Curing time, 0.5 mm [h] (10° C.; 80% RH)[4] | 6 | 3 | ~2 |
| Tack Free Time [min] (23° C.; 50% RH)[4] | 480 | n.d. | 55 |
| Stability (maximum thickness) [mm] | 2-3 | 2 | 4-5 |

[4] RH = rel. air humidity
*n.d. = not determined

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A sprayable, stable composition containing
   at least one organopolysiloxane containing hydroxyl groups, hydrolyzable groups, or both,
   at least one cross-linking agent on the basis of a functionalized silane,
   at least one filler on the basis of silicon dioxide, and
   at least one condensation catalyst,
   wherein the composition is free of water and solvents, and
   wherein the individual components in the composition are mixed and homogenized in one pot.

2. The composition as in claim 1, wherein the composition has a dynamic viscosity of a maximum of 10,000 mPa·s (Brookfield DV-I+; Spindle 6; 25° C.; 100 rpm).

3. The composition as in claim 1, wherein the at least one organopolysiloxane has a dynamic viscosity of a maximum of 10,000 mPa·s (Brookfield DV-II+; 25° C.; 100 rpm).

4. The composition as in claim 1, wherein the at least one organopolysiloxane comprises one hydroxyl group on each chain end and does not contain any additional hydroxyl groups and hydrolyzable groups.

5. The composition as in claim 1, wherein the cross-linking agent on the basis of a functionalized silane is selected from among organo-functional silanes.

6. The composition as in claim 5, wherein the cross-linking agent is a combination of two or more organofunctional silanes of differing functionality.

7. The composition as in claim 1, wherein the filler based on silicon dioxide is selected from the group comprising colloidal, pyrogenic, and precipitated silicic acid or a combination thereof.

8. The composition as in claim 7, wherein the filler on the basis of silicon dioxide is surface-treated.

9. The composition as in claim 1, wherein the composition contains a silicate-free filler.

10. The composition as in claim 9, wherein the silicate-free filler is selected from the group comprising carbonates, pyrogenic, and/or precipitated metal and/or half metal oxides or hydroxides or mixed oxides thereof, with the exception of silicon compounds, sulfates, carbides, nitrides, carbon modifications, natural non-silicate minerals, or carbon types or a combination thereof.

11. The composition as in claim 9, wherein the silicate-free filler is surface-treated.

12. The composition as in claim 1, wherein the composition contains at least one additional organopolysiloxane that is free of hydroxyl groups, hydrolyzable groups, or both.

13. The composition as in claim 12, wherein the one additional organopolysyloxane has a dynamic viscosity of 10 to 500 mPa·s (measured according to Brookfield DV-II+; 25° C.; 100 rpm).

14. The composition as in claim 1, wherein the composition contains an adhesion promoter.

15. A method for sealing an opening or a gap in building components comprising the steps of:
   (a) filling the opening or the gap with a carrier material,
   (b) spraying a coating of a composition as in claim 1, and
   (c) allowing the coating to cure.

16. The method as in claim 15, wherein the carrier material is selected from the group consisting of mineral wool, rock wool, glass wool, glass fibers, fiber glass or ceramic fibers, or a combination thereof.

* * * * *